US012686606B2

(12) United States Patent
Tasasiz et al.

(10) Patent No.: US 12,686,606 B2
(45) Date of Patent: Jul. 21, 2026

(54) BEVERAGE FILLING ROBOT

(71) Applicant: ROBİO AKILLI TARIM VE GIDA TEKNOLOJİLERİ ANONİM ŞİRKETİ, Kartal (TR)

(72) Inventors: Burak Tasasiz, Kartal (TR); Hakan Altinay, Tuzla (TR); Mustafa Taş, Eyüpsultan (TR)

( * ) Notice: Subject to any disclaimer, the term of this patent is extended or adjusted under 35 U.S.C. 154(b) by 205 days.

(21) Appl. No.: 18/645,627

(22) Filed: Apr. 25, 2024

(65) Prior Publication Data

US 2025/0313445 A1 Oct. 9, 2025

(30) Foreign Application Priority Data

Apr. 4, 2024 (TR) ................................ 2024/004265

(51) Int. Cl.
*B67D 1/00* (2006.01)
*B67D 1/08* (2006.01)

(52) U.S. Cl.
CPC .......... *B67D 1/0011* (2013.01); *B67D 1/0878* (2013.01); *B67D 1/0888* (2013.01)

(58) Field of Classification Search
CPC ... B67D 1/0011; B67D 1/0878; B67D 1/0888
See application file for complete search history.

(56) References Cited

U.S. PATENT DOCUMENTS

| | | | | |
|---|---|---|---|---|
| 12,297,093 B2 * | 5/2025 | Wach | .................. | B67D 1/1227 |
| 2024/0076179 A1 * | 3/2024 | Dirik | .................. | B25J 15/0616 |

FOREIGN PATENT DOCUMENTS

| | | | | |
|---|---|---|---|---|
| CN | 112794271 | * 5/2021 | .............. | B67D 1/16 |

* cited by examiner

*Primary Examiner* — Timothy L Maust
(74) *Attorney, Agent, or Firm* — EGBERT, MCDANIEL & SWARTZ, PLLC

(57) ABSTRACT

Disclosed is a beverage filling robot that can be mounted on traditional beverage dispensers and used in restaurants, cafes and other businesses that sell beverages, where the user can determine the desired beverage, desired cup size and amount of ice through the operator panel.

11 Claims, 3 Drawing Sheets

BEVERAGE FILLING ROBOT

CROSS-REFERENCE TO RELATED APPLICATIONS

Not applicable.

BACKGROUND OF THE INVENTION

The invention relates to a beverage filling robot.

The invention particularly relates to a beverage filling robot that can be mounted on traditional beverage dispensers and used in restaurants, cafes and other businesses that sell beverages, where the user can determine the desired beverage, desired cup size and amount of ice through the operator panel.

The traditional beverage dispenser is a device that allows beverages to be served easily and in a controlled manner. It is generally used in restaurants, cafes, fast-food chains, buffets and similar businesses. These dispensers are designed to make serving beverages easy and fast to customers. The traditional beverage dispenser usually has these components:

- Tank or Reservoir: There is a large tank or reservoir where beverages are stored and served. These tanks are usually made of glass or plastic material and are designed to be easy to clean and fill with beverages.
- Pump or Tap: There is a pump or tap that allows the beverage to be taken from the tank and served. It may have a simple pressure regulator or arm for users to pour the beverage.
- Cooling System: Some traditional beverage dispenser models include a cooling system to cool beverages. This system keeps the beverages fresh and cool and offers users a more enjoyable drinking experience.
- Labeling and Identification: Each tank or reservoir is usually identified by labels indicating the type of beverage. This helps the user to easily find their desired beverage.

The traditional beverage dispenser speeds up beverage service while also providing better control of beverage stock. These types of dispensers are ideal for businesses with different beverage options and are used to offer users a variety of beverage options.

It is known that beverage filling robots are used in the prior art. Beverage filling robots automatically fill bottles or packages. These robots are programmed to accurately fill a specific volume of beverage and generally operate with high precision and efficiency. Beverage filling robots are used to automate production processes in facilities and reduce human intervention. These robots can use a variety of technologies and mechanisms to fill different types of beverages. For example, they can fill the right amount of beverage by sensing liquid levels or measuring volume. These robots make processes faster, more reliable and more efficient. They also help reduce overall costs by reducing human errors and labor costs.

In the prior art, beverage machines are used that automatically fill the cup when it is brought to the level of the beverage and/or ice nozzle, and the filled cups are not left at a specific station. Another prior art uses beverage machines that carry the cup to the relevant stations with a robotic arm of industrial standards and must be located in a special cabinet to operate. The fact that the structures used in the present art have to work in a special cabin makes them not suitable for working with humans. In addition, it can be seen that in the mentioned embodiments, a method for closing the lid on the cup is not described.

As a result, it has become necessary to make a development in the relevant technical field due to the negativities described above and the inadequacy of existing solutions on the subject.

SUMMARY OF THE INVENTION

At The invention is inspired by current situations and aims to solve the above-mentioned negativities.

The main purpose of the invention is to automate beverage dispensers by surrounding existing beverage dispensers without occupying a specially enclosed/determined area. The beverage filling robot, which is subject of the invention is mounted on the mentioned beverage dispensers without any modification and/or change on the existing beverage dispensers.

Another purpose of the invention is to provide automatic closing of the lid of the cup filled with ice and beverage.

Another purpose of the invention is to provide a design that can be accessed to the beverage dispenser in order to ensure that the service and maintenance operations of the beverage dispenser in which it is used can be carried out without any problems. In this way, the dispenser can be maintained without disassembling the beverage filling robot, which is subject of the invention.

Another purpose of the invention is to produce a beverage filling robot that is suitable for working with humans and does not require a special space to perform its function.

Another purpose of the invention is to provide ease of use to users by providing order information via an operator screen.

Another purpose of the invention is to increase working efficiency by reducing the labor force.

In order to achieve the purposes described above, it is a beverage filling robot that is manually operated, used to store and serve beverages, and is used by connecting with the beverage dispenser to automate the beverage dispenser containing the following:

- beverage valves, one for each different beverage and that allow the beverages to flow through and be poured into a cup that can be selected in different sizes,
- a beverage collecting arm that allows the beverage valve to pour beverages into the cup by pushing it,
- an ice collecting section that allows ice to be poured into the cup,
- an ice collecting arm that allows ice to be poured into the cup from the ice collecting section by pushing it, comprising:

- at least one cup slot located at the top of the beverage filling robot, in which cups of the same size are stacked inside each other,
- a cup holder that is positioned side by side on the cup holders and can move vertically,
- a cup holder movement mechanism comprising a motor and bearings working in a coordinated manner to enable the movement of the cup holder,
- at least one lid slot in which the lids used to cover the beverages filled into the cups are stacked inside each other,
- a fixed lid holder on which the lid slots are positioned side by side,
- at least one cup carrying stand that can be positioned in the same vertical direction as the cup,
- a cup carrying movement mechanism to ensure that the cup carrying stand is moved to the horizontal projection of the position of the cup slot where the relevant cup is located, according to the cup size in the current order, a cup vacuum line located on the cup carrying stand, which is activated when the cup holder is lowered, which is moved by the cup holder movement mechanism, a cup vacuum head to ensure that the cup on the cup carrying stand sticks and remains on the cup carrying stand when the cup holder is moved all the way down and pulled up again by the cup holder movement mechanism, a robotic arm that has a serial manipulator system that can grab the cups on the cup carrying stand from any desired location with the holder fingers on it and drop them to the desired location, and can extend the holder fingers towards the cups by means of the serial rotary joints in its structure, and performs the following functions:

if ice is requested, it goes in front of the ice collecting section and reaches and pushes the ice collecting arm according to the desired amount of ice, and when enough ice falls into the cup, it can return to its previous position, it can go in front of the beverage valve for the selected beverage and adjust its height according to the size of the cup, reach towards the relevant beverage valve and push the beverage collecting arm to fill the cup according to the selected cup size, after finishing the beverage filling process, it brings the cup and places it on a lid closing stand to ensure that the cup is aligned for the lid closing process, after filling the beverage, it moves towards a lid closing mechanism for lid closing process, a cup carrying motion mechanism to enable the cup carrying stand to be moved horizontally towards the robot arm so that the cup is caught by the robotic arm, a lid catcher that can move both vertically and horizontally and whose viewing direction can be turned up or down, depending on the selected cup size, move horizontally according to the lid slot in which the appropriate lid is located, and bring the lid to the vertical level of the lid slot to be taken and can move towards the relevant lid slot by making vertical movement, a lid vacuum head located on the cup catcher, which adheres to the lid with the contact and holds the lid, a lid vacuum line located on the lid catcher and forming or eliminating vacuum in the lid vacuum head, a lid vertical movement mechanism that allows the lid catcher to move downwards towards the cup in order to attach the lid adhered to the lid vacuum head on the lid catcher to the cup full of beverages, a cup parking area, where the cup filled with beverages and the lid closed is left after being taken from the lid closing stand by the robot arm, opto-reflective sensors, which sense the reflection of the emitted light hitting an object in front of it and thus detect whether there is an object in front of it to detect the following information:

information about whether the cups in the cup slots are low or not, information about whether the lids in the lid slots are reduced or not, information about whether there are cups in the cup carrying stand or not, information about the cups in the cup holder section are decreasing, information about whether there are cups on the cup carrying stand or not, information about whether the lid catcher caught the lid or not, information about whether there are cups at the top of the cup parking area or not, operator screens where the beverage requests of the user are received, and a control computer to send commands to the motors connected to the movement mechanisms, respectively, with the data coming from all the sensors connected to it and the requests from the operator screens.

The structural and characteristic features and all the advantages of the invention will be more clearly understood by means of the drawings given below and the detailed description written with references to these drawings, and therefore the evaluation needs to be made by taking these drawings and the detailed description into consideration.

DESCRIPTION OF PART REFERENCES

Figure 1:
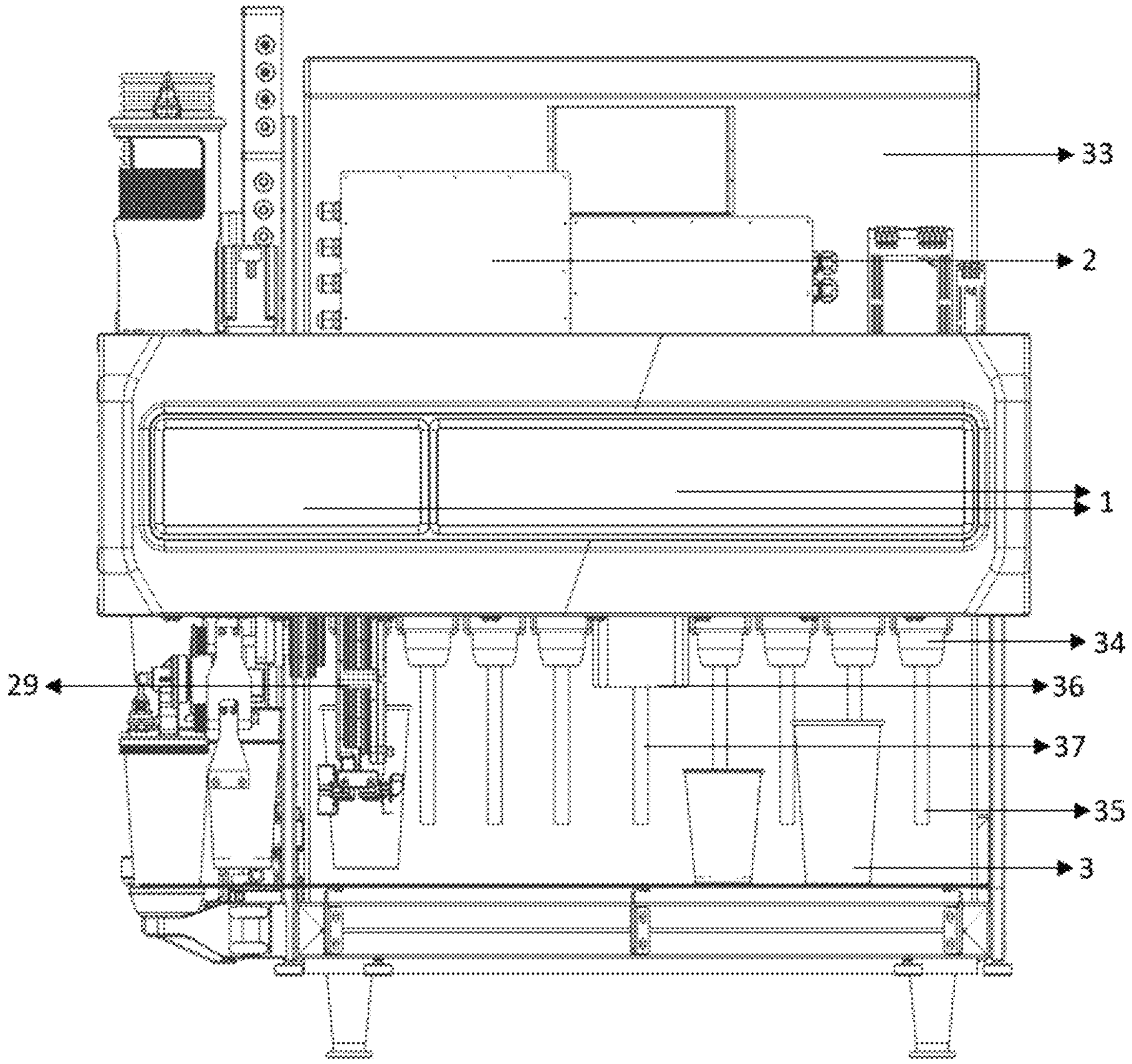
FIG. 1 is a front view of the beverage filling robot, which is the subject of the invention.
Figure 2:
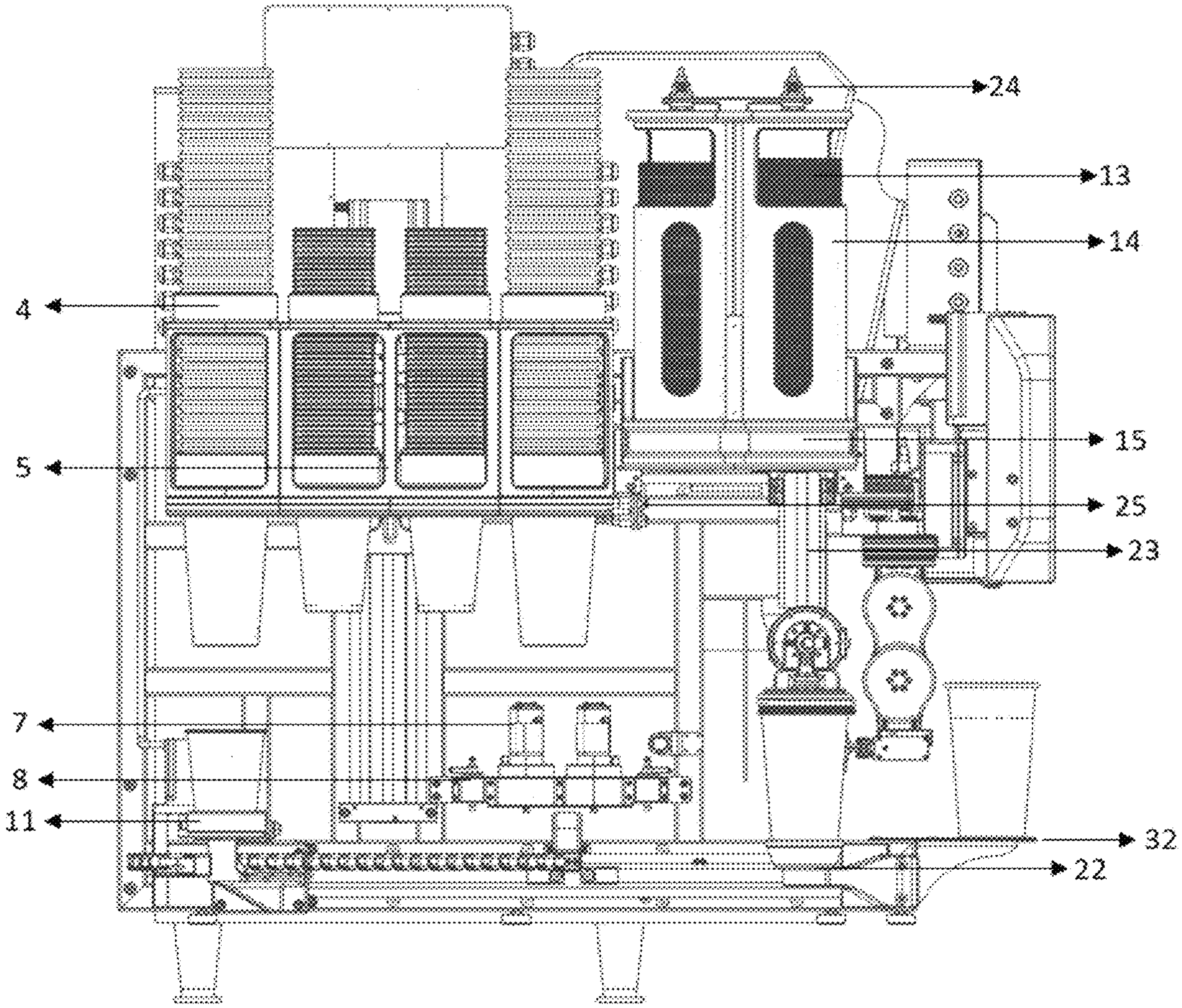
FIG. 2 is a side view of the beverage filling robot, which is the subject of the invention.
Figure 3:
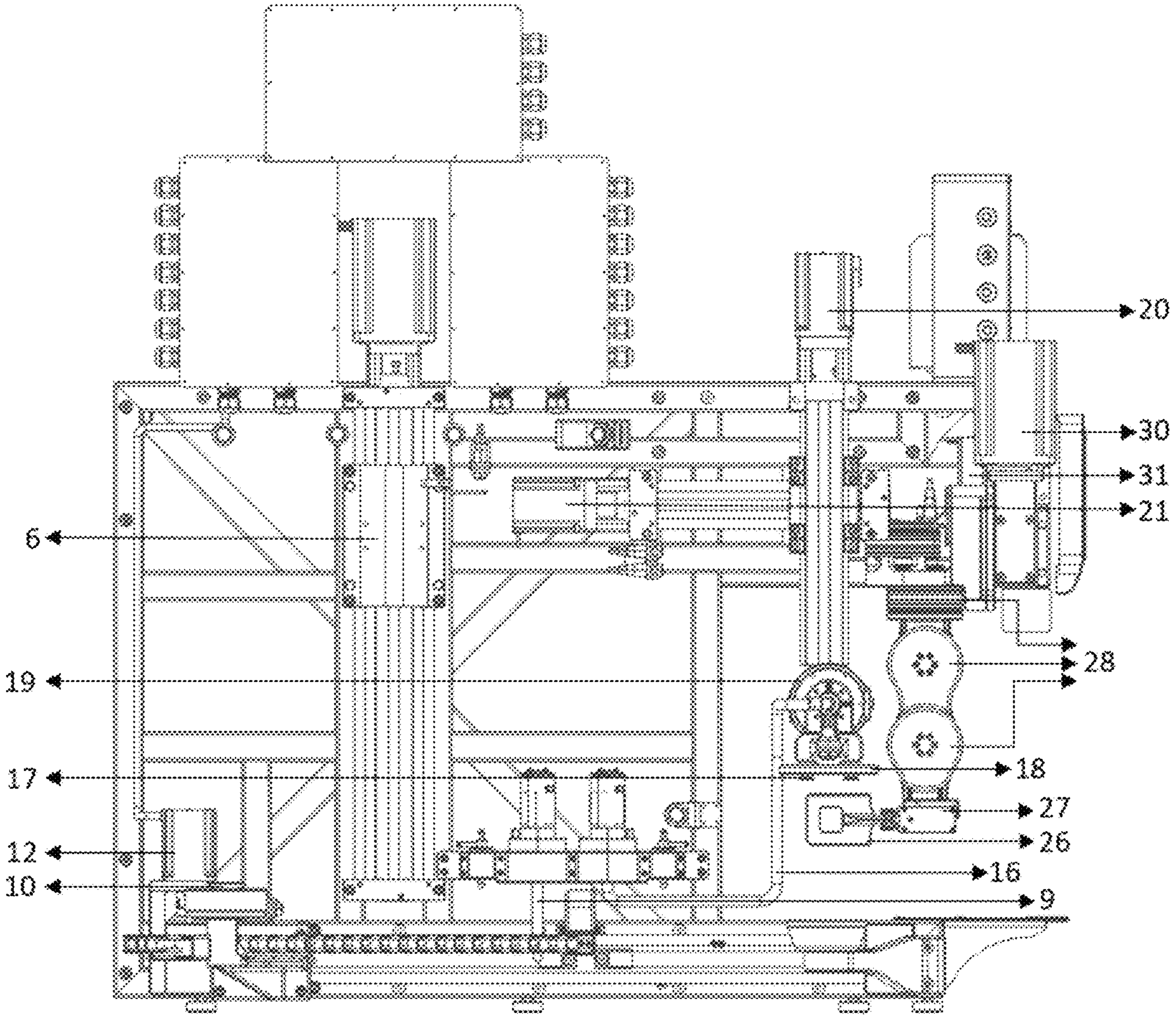
FIG. 3 is a side view of the internal mechanism of the beverage filling robot, which is the subject of the invention.

1. Operator screen
2. Control computer
3. Cup
4. Cup slots
5. Cup holder
6. Cup holder movement mechanism
7. Air suction motor
8. Solenoid valve
9. Cup vacuum line
10. Cup vacuum head
11. Cup carrying stand
12. Cup carrying movement mechanism
13. Lid
14. Lid slots
15. Lid holder
16. Lid vacuum line
17. Lid vacuum head
18. Lid catcher
19. Lid rotating mechanism
20. Lid vertical movement mechanism
21. Lid horizontal movement mechanism
22. Lid closing stand
23. Lid closing mechanism
24. Opto-reflective sensor
25. Inductive proximity sensor
26. Holder finger
27. Holder finger movement mechanism
28. Rotating joints
29. Robot arm
30. Robot arm horizontal movement mechanism
31. Robot arm vertical movement mechanism
32. Cup parking area
33. Beverage dispenser
34. Beverage valve
35. Beverage collecting arm
36. Ice collecting section
37. Ice collecting arm
A. Beverage filling robot

DETAILED DESCRIPTION OF THE INVENTION

In this detailed description, the preferred embodiments of the beverage filling robot (A), which is the subject of the invention are described only for a better understanding of the subject.

The beverage filling robot (A), which is subject of the invention will be used in connection with a beverage dispenser (33) and will enable the automation of the normally manually operated beverage dispenser (33). Beverage dispenser (33) is a machine used to store and serve beverages, which is widely used in many different places such as restaurants, cafes, hotels and offices. There are beverage valves (34) at the front of the beverage dispenser (33), one for each different beverage that allows the beverages to flow through and be poured into a cup (3). Beverage valves (34) are generally arranged side by side at the front of the beverage dispenser (33). Beverage valves (34) generally comprise a beverage collecting arm (35), which allows the beverage valve (34) to pour a beverage into a cup (3) by pushing it. The beverage dispenser (33) also comprises an ice taking section (36) that allows ice to be poured into the cup (3) and an ice collecting arm (37) that allows ice to be poured from the ice taking section (36) into the cup (3) by pushing it. Said cup (3) can have different sizes and volumes such as small, medium and large. Lids (13) with different sizes are used to close the beverages filled into said cups (3), depending on the different cup (3) sizes used.

There is at least one cup slot (4) on the upper parts of the beverage filling robot (A), which is of the invention, in which cups (3) of the same size are stacked inside each other. The cup slots (4) are positioned side by side on a cup holder (5), and said cup holder (5) can move vertically. This movement of the cup holder (5) ensures that the cups (3) make the same movement simultaneously. The movement of the cup holder (5) is provided by a cup holder movement mechanism (6) comprising a motor and bearings working in a coordinated manner. The information about whether the cups (3) in the cup slots (4) are decreasing or not is read by an opto-reflective sensor (24). The opto-reflective sensor (24) is a sensor that detects the reflection of the emitted light hitting an object in front of it and thus detects whether there is an object in front of it or not.

There is at least one lid slot (14) on the upper parts of the beverage filling robot (A), which is of the invention, preferably on the side of the cup holder (5), in which lids (13) of the same size are stacked together. The lid slots (14) are positioned side by side on a lid holder (15), and said lid holder (15) is positioned fixedly. Therefore, said lids (13) are also motionless. The information about whether the lids (13) inside the lid slots (14) decrease or not is read by an opto-reflective sensor (24).

There is at least one cup carrying stand (11) so that the beverage filling robot (A) can be positioned in the same vertical direction as the cup (3). The cup carrying stand (11) is selected according to the sizes of the cups (3), and the sizes that the cups (3) can fit into. The information about whether there is a cup (3) inside the cup carrying stand (11) or not is read by an opto-reflective sensor (24). The cup carrying stand (11) is moved by a cup carrying movement mechanism (12) to the horizontal projection of the position of the cup slot (14) where the relevant cup (3) is located, according to the size of the cup (3) in the current order. When the cup holder (5), which is moved by the cup holder movement mechanism (6), is lowered, a cup vacuum line (9) on the cup carrying stand (11) is activated. When the cup holder (5) is moved to the bottommost and pulled up again by the cup holder movement mechanism (6), the cup (3) on the cup carrying stand (11) adheres to a cup vacuum head (10) and remains on the cup carrying stand (11). Meanwhile, the other cups (3) move upwards on the cup holder (5). The presence of the cup (3) remaining on the cup carrying stand (11) is monitored with the help of an opto-reflective sensor (24). If there is no cup (3) on the cup carrying stand (11), the cup taking process is repeated several times. If a cup (3) is detected on the cup carrying stand (11), the next step, the cup catching phase, is started. There is an opto-reflective sensor (24) in each of the cup slots (14) located in the cup holder (5). It is detected when the cups (3) in the cup holder (5) are low with the help of these sensors, and the user is notified via the operator screens (1) to place the cups (3) in the relevant cup slot (14).

The cup (3) on the cup carrying stand (11) is caught by a robotic arm (29). The robotic arm (29) is a serial manipulator system that can grab the cups (3) from any desired location with the holder fingers (26) on it and release them to the desired location, and can extend the holder fingers (26) towards the cups (3) by means of the serial rotary joints in its structure. The holder fingers (26) are the structure used to hold and release the cup (3) by moving the finger distances further and closer to each other. There is a holder finger movement mechanism (27) to ensure that the holder fingers (26) move further and closer to each other. The robotic arm (29) comprises rotary joints (28) to enable it to rotate circularly around its own axis. Horizontal movement of the robotic arm (29) is provided by a robotic arm horizontal movement mechanism (30), and vertical movement of the robot arm (29) is provided by a robotic arm vertical movement mechanism (31).

When the cup (3) is detected by the opto-reflective sensor (24) on the cup carrying stand (11), in order for the cup (3) to be caught by the robot arm (29), the cup carrying stand (11) is moved horizontally towards the robot arm (29) by the cup carrying movement mechanism (12). Meanwhile, the holder finger movement mechanism (27) of the robotic arm (29) has the holder fingers (26) in the fully open position. Afterwards, the robotic arm (29) uses its rotating joints (28) to reach forward and adjusts the distance between the holder fingers (26) according to the size of the cup (3). Depending on where the cup (3) needs to be held, the robotic arm (29) is moved vertically by the vertical movement mechanism (31) and the cup (3) is caught in this way. The height of the robotic arm (29) is brought back and the robotic arm (29) returns to its previous position with its rotating joints (28) before extending.

The beverage filling robot (A), which is subject of the invention receives the user's beverage requests through the operator screens (1) on the invention. The operator can enter the beverage selection and the cup size and ice amount of the selected beverage from the operator screens (1) on the invention, and can edit and cancel the entered orders. The beverage filling robot (A) adds the orders sent to it to an order queue with the "First in, first out (FIFO)" logic. If the operator desires, he/she can add an urgent order to the front of the queue with a manual command. All movements of the beverage filling robot (A) are programmed into the control computer (2) inside the beverage filling robot (A). The control computer (2) sends various commands to the motors connected to the movement mechanisms, respectively, accompanied by data from all sensors connected to it. All software algorithms of the beverage filling robot (A) run on the control computer (2).

After the robotic arm (29) catches the cup (3), the control computer (2) plans the movements of the system according to the type of beverage and ice selected by the operator using the operator screens (1). If the ice selection is made as "without ice", the robotic arm (29) does not go to the ice taking section (36) of the beverage dispenser (33) on which the invention is mounted, but moves directly horizontally towards the selected beverage of the beverage dispenser (33). If ice is requested, it goes in front of the ice collecting section (36) and reaches and pushes the ice collecting arm (37) according to the desired amount of ice. When enough ice falls into the cup (3), it returns to its previous position. Then, it goes in front of the beverage valve (34) for the selected beverage. The robotic arm (29) adjusts its height according to the size of the cup (3), reaches towards the relevant beverage valve (34) and pushes the beverage collecting arm (35). Depending on the selected cup (3) size, it waits for the cup (3) to be filled and withdraws. After filling the beverage, the robotic arm (29) moves towards a lid closing mechanism (23) with the robotic arm horizontal movement mechanism (30) for the lid closing process. If the robotic arm (29) hits anything during its movement, it stops for safety and a warning message is given to the operator via the operator screens (1). The system does not continue its movement until a command to continue the operation is sent from the operator screens (1).

After the robot arm (29) completes the beverage filling process, it brings the cup (3) and put it on the lid closing stand (22). The beverage-filled cup (3) is aligned for the lid closing process by means of the conical design of the lid closing stand (22), Afterwards, the lid closing process begins.

The lid closing mechanism (23) ensures that the upper part of the cup (3) is closed with a lid (13). After the selected beverage and ice are put in the cup (3), the cup (3) is carried to the location of the lid closing mechanism (23) by the robotic arm (29). The lid closing mechanism (23) takes the lid (13) suitable for the selected cup (3) size from the lid holders (15) while the robotic arm (29) is filling beverages and ice. In this way, it is aimed to shorten the total processing time. The lid rotating mechanism (19) starts the movement by turning the lid catcher (18) upwards. The lid catcher (18) can move both vertically and horizontally by means of the lid horizontal movement mechanism (21) and lid vertical movement mechanism (20). Depending on the selected cup (3) size, the lid catcher (18) moves horizontally depending on which lid slot (14) the appropriate lid (13) is located in, and the lid (13) comes to the vertical alignment of the lid slot (14) to be taken. Afterwards, the lid vacuum line (16) located on the lid catcher (18) is activated by starting the air suction motor (7) connected to this line. The lid catcher (18) moves vertically and starts moving towards the relevant lid slot (14). This movement continues until the lid to be taken (13) comes into contact with the lid vacuum head (17) on the lid catcher (18). After contact, the lid (13) on the lid catcher (18) adheres to the cover vacuum head (17). After the lid catcher (18) moves downwards, it is checked whether the lid (13) is caught or not by the opto-reflective sensor (24) on it. If the lid (13) is not caught, it repeats the catching process several times. If the lid (13) is caught, the lid catcher (18) makes a downward rotation movement and waits for the robotic arm (29) to bring the beverage-filled cup (3).

The lid catcher (18) moves downwards towards the cup (3) according to the size of the cup (3) by means of the lid vertical movement mechanism (20), and the lid (13) attached to the lid vacuum head (17) on the lid catcher (18) is ensured to be attached to the beverage-filled cup (3). After the attachment process is completed, the air suction motor (7) connected to the lid vacuum line (16) is turned off, the solenoid valve (8) connected to the lid vacuum line (16) is opened and the vacuum in the lid vacuum line (16) is eliminated. The lid catcher (18) moves upwards, the filled cup (3) whose lid (13) is closed is caught again by the robotic arm (29) and taken from the lid closing stand (22).

The air suction motor (7) is the actuator that forms a vacuum environment by evacuating the air of the vacuum line to which it is connected, by means of the motor inside, and the solenoid valve (8) is the actuator that separates or combines the two pneumatic lines it is connected to, by means of the electrical signal it receives. Since one line of the solenoid valve (8) is directly open to the atmosphere, it eliminates the vacuum by connecting the vacuum line to which it is connected with the atmosphere when the signal arrives.

After the cup (3), with the beverage filled and lid closed, is taken from the lid closing stand (22) by the robot arm (29), the cup parking area (32) is scanned for a suitable place. There are opto-reflective sensors (24) at the top of the cup parking area (32) that control the presence of the cup (3). The control computer (2) controls the cup parking area (32) with these opto-reflective sensors (24) and after determining a suitable area, gives the robot arm (29) a movement command. After the robotic arm (29) makes its horizontal movement towards the cup parking area (32) by means of to the rotary joints (28) on it, it turns around itself towards the cup parking area (32) and reaches out to drop the cup (3). The robotic arm (29) releases the cup (3) by moving vertically downwards and widening the distance between the holder fingers (26) and returns to its previous position. After releasing the cup (3), the contents of the cup (3), its size and which order it belongs to are indicated to the operator with user-friendly visuals on the operator screens (1) at the level of the cup (3). In this way, the cup (3) is digitally labeled. If there is another order in the order queue, the robot arm (29) continues its work in the same order from the beginning after dropping the cup (3).

In the beverage filling robot (A), which is the subject of the invention, inductive proximity sensors (25) are used to calibrate the positions of both the robot arm horizontal movement mechanism (30) and the robot vertical movement mechanism (31). Inductive proximity sensors (25) detect the presence of an object approaching nearby using the principle of electromagnetic induction.

The beverage filling robot (A), which is the subject of the invention, takes the cup (3) suitable for the order from the cup holder (5) at the front of the order queue by means of all the sensors and movement mechanisms on it, it fills the ice and beverage selections into the cup (3), closes the lid (13) by using the robot arm (29), and completes a cycle by placing the cup (3) in the available part of the cup parking area (32). Ready cups (3) can be served by operators by taking them from the cup parking area (32).

The invention claimed is:

1. An assembly comprising:

a beverage dispenser;

a plurality of beverage valves connected to said beverage dispenser and adapted to allow respective plurality of beverages therethrough in order to be introduced into a cup;

a beverage collecting arm connected to at least one of said plurality of beverage valves so as to allow the at least one of said plurality of beverage valves to pour the plurality of beverages into a cup, said beverage collecting arm being pushable in relation to said beverage dispenser;

an ice collecting section formed in said beverage dispenser;

an ice collecting arm cooperating with said ice collecting section and pushable in relation to said beverage dispenser in order to allow said ice collecting section to pour ice into the cup;

at least one cup slot positioned at a top of said beverage dispenser and adapted to allow cups to be stacked therein one inside another;

a cup holder movable vertically on said beverage dispenser;

an actuator connected to said cup holder, said actuator having a motor and bearings mounted together in a coordinated manner so as to move said cup holder to move vertically, at least one lid slot formed on said beverage dispenser, said at least one lid slot adapted to receive a lid that is used to cover the cup;

a fixed lid holder having the at least one lid slot therein;

at least one cup carrying stand positioned on said beverage dispenser at a common vertical level as the cup;

a cup carrier cooperative with said at least one cup carrying stand to move said at least one cup carrying stand to a horizontal position of said at least one cup slot;

a cup vacuum line positioned on the cup carrying stand, said cup vacuum line being activatable when said cup holder is lowered by said actuator;

a cup vacuum head cooperative with said at least one cup on the cup carrying stand and adapted to impart a vacuum to the cup on the at least one cup carrying stand so as to ensure that the cup remains on the at least one cup carrying stand as said cup holder is moved vertically;

a robotic arm having a serial manipulator that is adapted to grab the cup on the at least one cup carrying stand with holder fingers and adapted to drop the cup at a desired location, the holder fingers being actuated by serial rotary joints so as to extend toward the cup, wherein said robotic arm moves toward a front of said ice collecting section and pushes the ice collecting arm so as to release an amount of ice into the cup and to return to a home position if ice is requested, wherein said robotic arm moves toward said plurality of beverage valves in order to select one of the plurality of beverages and to adjust a height of the cup and to push the beverage collecting arm in order to fill the cup, wherein said robotic arm grabs the filled cup and moves the filled cup to said lid carrying stand such that the lid is placed on the filled cup;

a cup carrying mechanism connected to said cup carrying stand, said cup carrying mechanism moving said cup carrying stand horizontally to said robotic arm;

a lid catcher movable vertically and horizontally toward said at least one lid slot in order to move the lid to a vertical level of said at least one lid slot;

a lid vacuum head positioned on said lid catcher, said lid vacuum head adhering to the lid;

a lid vacuum line positioned on the lid catcher so as to form a vacuum or to release the vacuum in said lid vacuum head;

a lid mover cooperative with said lid catcher so as to allow said lid catcher to move downwardly toward the cup in order to attach the lid to the filled cup;

a cup parking area exterior of said beverage dispenser, said cup parking area adapted to receive the filled cup and lid from said robotic arm;

a plurality of opto-reflective sensors that sense a reflection of the emitted light from an object so as to detect a presence of the object and in order to detect at least one of (a) information as to whether the cup in the at least one cup slot is at a low level; (b) information at to whether the lids in the at least one lid slot are at a low level; (c) information as to whether cups on the cup carrying stand; (d) information at to whether a number of cups in the cup holder section is low; (e) information as to whether the lid catcher caught the lid; and (f) information as to whether there is a cup at the top of the cup parking area;

at least one operator screen adapted to receive a beverage request by a user, said at least one operator screen being connected to said beverage dispenser; and a control computer connected to said actuator in order to transmit a signal thereto based on data received from said plurality of opt-reflective sensors and from said at least one operator screen.

2. The assembly of claim 1, wherein said holder fingers hold the cup as the holder finger approach each other and release the cup as the holder fingers move away from each other.

3. The assembly of claim 1, further comprising:

a holder finger movement mechanism connects to the holder fingers so as to move the holder fingers toward or away from each other.

4. The assembly of claim 1, wherein said robotic arm has a rotatory joint that allows said robotic arm to rotate circularly.

5. The assembly of claim 1, wherein said robotic arm has a horizontal movement mechanism that allows said robotic arm to move horizontally.

6. The assembly of claim 1, wherein said robotic arm has a vertical movement mechanism that allows for vertical movement of said robotic arm.

7. The assembly of claim 1, wherein said lid closing stand has a conical shape.

8. The assembly of claim 1, wherein said lid catcher has a horizontal movement mechanism that allows said lid catcher to move horizontally.

9. The assembly of claim 1, wherein said lid catcher has a vertical movement that allows said lid catcher to move vertically.

10. The assembly of claim 1, further comprising:

an air suction engine connected to the lid vacuum line in order to form a vacuum by evacuating air from the lid vacuum line.

11. The assembly of claim 1, further comprising:

an inductive proximity sensor that detects the presence of the object, said inductive proximity sensor adapted to calibrate a position of a horizontal movement mechanism and the vertical movement mechanism of said robotic arm.

* * * * *